United States Patent
Colwell

(10) Patent No.: US 8,533,354 B1
(45) Date of Patent: Sep. 10, 2013

(54) INITIATING MEDIA PRESENTATION PRIOR TO RECEIVING SEEK INDEX DATA

(75) Inventor: Aaron James Colwell, Seattle, WA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/454,681

(22) Filed: Apr. 24, 2012

(51) Int. Cl.
*G06F 15/16* (2006.01)

(52) U.S. Cl.
USPC .......................................................... 709/231

(58) Field of Classification Search
USPC .......................................................... 709/231
See application file for complete search history.

(56) References Cited

U.S. PATENT DOCUMENTS

| 7,558,806 | B2 * | 7/2009 | Bobrovskiy et al. ................... 1/1 |
| 8,205,004 | B1 * | 6/2012 | Kaufman et al. ............. 709/231 |
| 2007/0276910 | A1 | 11/2007 | Deboy et al. |
| 2009/0164653 | A1 * | 6/2009 | Mandyam et al. ............ 709/231 |
| 2009/0249222 | A1 | 10/2009 | Schmidt et al. |
| 2010/0043038 | A1 | 2/2010 | Li |

* cited by examiner

*Primary Examiner* — Yves Dalencourt
(74) *Attorney, Agent, or Firm* — Turocy & Watson, LLP

(57) ABSTRACT

Systems and methods for initiating presentation of media content prior to receiving seek index data associated with the media content. In particular, if necessary, the seek index data can be received after playback and/or presentation of the media content begins. Thus, delays associated with obtaining or otherwise processing seek index data can be reduced or postponed or in cases of adaptive streaming, higher quality presentation of the media content can be achieved.

20 Claims, 10 Drawing Sheets

INITIATING MEDIA PRESENTATION PRIOR TO RECEIVING SEEK INDEX DATA

TECHNICAL FIELD

This disclosure generally relates to initiating presentation or playback of media content prior to receiving all or a portion of seek index data associated with the media content.

BACKGROUND

Media content is typically stored in a container that includes stream data, which represents the actual audio/video data, and seek index data, which represents an index of media frames, often associated with a time code indicating the playback time at which a particular frame occurs. Thus, seek operations such as fast-forward or rewind instructions conventionally necessitate examination of the seek index in order to determine which media frame to present after the fast-forward or rewind operation.

Conventional media content playback systems therefore require the seek index to be loaded (and/or downloaded in the case of streaming media content) before beginning playback of the media content. Hence, most media content container formats place the seek index at the beginning of the media content file. However, even in cases in which the seek index is not at the beginning of the file, the seek index will be fetched before starting playback. Because seek index data can be large, significant initial playback latency can be attributed to acquisition of the seek index.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to initiating presentation of media content before receiving seek index data associated with the media content. An identification component can be configured to identify a media content container associated with media content selected for presentation by one or more device; the media content container is formatted to include stream data and seek index data. A fetching component can be configured to receive the stream data. A player component can be configured to initiate presentation of the stream data by the one or more devices prior to receiving the seek index data.

Other embodiments relate to methods for initiating presentation of media content prior to receiving seek index data associated with the media content. For example, a media content container selected for presentation and including stream data and seek index data can be identified. The stream data can be received from the media content container. Playback of the stream data can be initiated prior to receiving the seek index data from the media content container.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
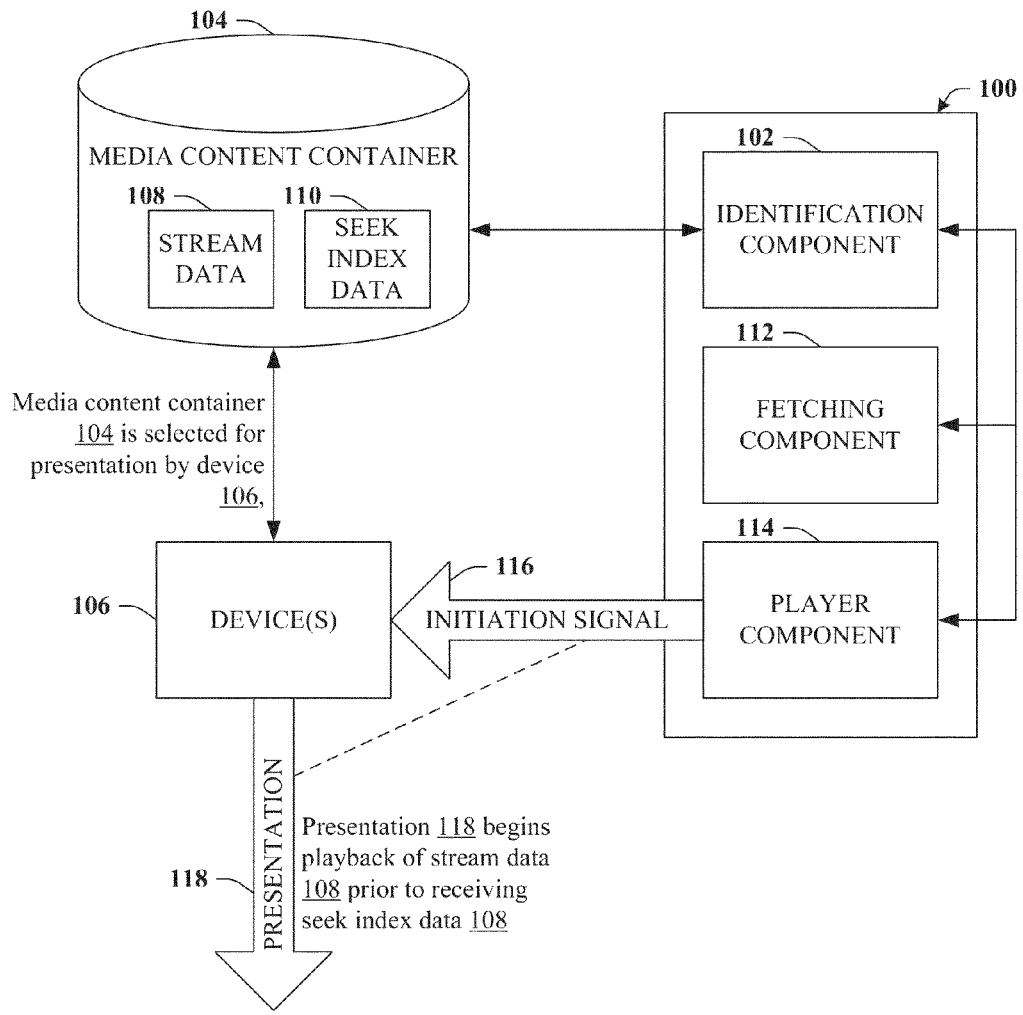
FIG. 1 illustrates a high-level block diagram of an example system that can initiate playback of media content prior to requesting and/or receiving seek index data associated with the media content in accordance with certain embodiments of this disclosure.

Conventional approaches operate by fetching both stream data and seek index data prior to beginning playback of the media content. Systems and methods disclosed herein, by contrast, relate to beginning playback (e.g., a presentation) of media content prior to receiving seek index data. Thus, the delay between selecting media content for presentation and the actual presentation of that media content can be reduced, as a consumer of the media content is not required to wait for seek index data to be obtained and/or processed before the media content presentation begins.

Benefits of the disclosed subject matter can be realized in connection with substantially any type of media content presentation, but can be particularly advantageous in connection with network-based streaming of the media content. For example, it is not necessary to allocate bandwidth to obtaining the seek index prior to beginning the presentation. In cases of adaptive streaming or other techniques in which the media content is partitioned into some number of files, N, it is not necessary to wait for N seek indexes to be received before starting playback.

However, after playback has begun, seek index data can be received. Advantageously, seek index data can be received during times of relatively low resource utilization (e.g., processor, memory, bandwidth, etc.) rather than during the relatively high resource utilization that occurs during initiation of the media content presentation. For example, seek index data can be requested and/or received based upon spare capacity associated with resource utilization. Additionally or alternatively, seek index data can be requested and/or received in response to input from the consumer of the media content. For instance, the content consumer might rewind, fast-forward, skip tracks or otherwise perform an action in which the seek index data is required to properly interpret and resume the media content presentation.

Initiating Media Content Playback Prior to Receiving Seek Index Data

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

Referring now to FIG. 1, a system 100 is depicted. System 100 can initiate playback of media content prior to requesting and/or receiving seek index data associated with the media content. Embodiments disclosed herein can, for example, reduce latency and/or load time in connection with a presentation of the media content given it is not necessary to fetch seek index data prior to presenting the media content. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include an identification component 102, a fetching component 112, and a player component 114.

Figure 2:
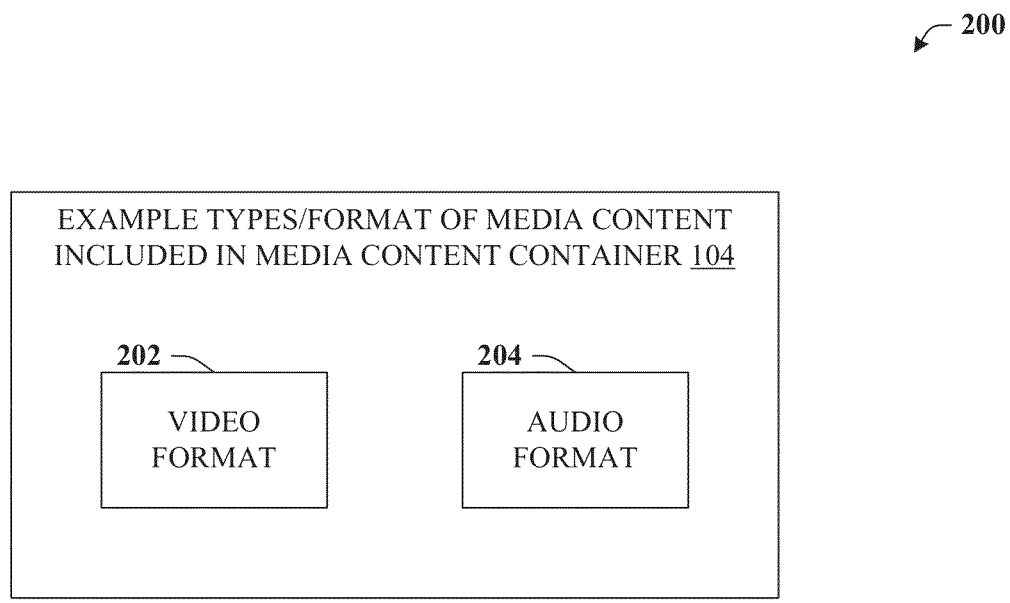
FIG. 2 depicts an example block illustration that depicts various exemplary media content formats in accordance with certain embodiments of this disclosure.

Identification component 102 can be configured to identify media content container 104 selected for presentation by one or more devices 106. As used herein, media content can relate to audio media, video media, or a combination of audio and video, which is further illustrated in connection with FIG. 2. FIG. 2 provides illustration 200 that depicts a few exemplary media content formats. For example, any suitable video format 202 or audio format 204 that includes seek index data can be utilized in connection with embodiments disclosed herein.

Turning back to FIG. 1, media content container 104 can be formatted to include stream data 108 and seek index data 110. Stream data 108 can represent the audio/video frames that compose the media content to be presented. Seek index data 110 can represent one or more indexes of the media frames and can include time codes indicating the playback times at which various frames are to be processed.

Device(s) 106 can be substantially any device capable of facilitating or providing a presentation (e.g., presentation 118) of the media content (e.g., stream data 108) and can include or be coupled to any suitable output devices such as speakers, a screen or display, etc.

Fetching component 112 can be configured to receive stream data 108 included in media content container 104. In some embodiments, fetching component 112 can issue a request for stream data 108 and receive stream data 108 in response to the request.

Player component 114 can be configured to initiate presentation 118 of stream data 108 by the one or more devices 106 prior to receiving seek index data 110. For example, upon receiving an adequate portion of stream data 108 at device 106, player component 114 can provide initiation signal 116 to indicate presentation 118 can begin even though device 106 has not received seek index data 110.

Figure 3:
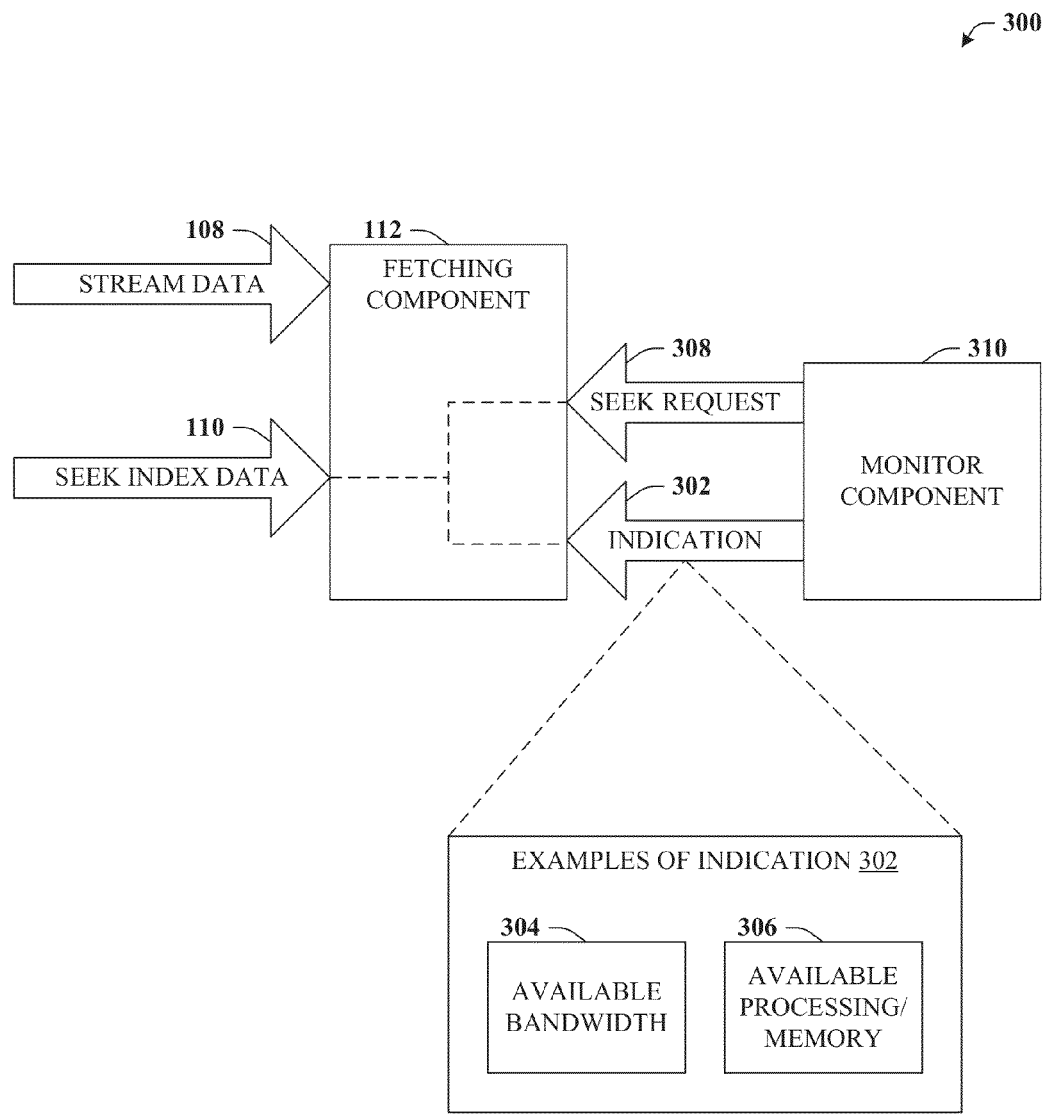
FIG. 3 illustrates a block diagram of a system that depicts additional features in connection with the fetching component in accordance with certain embodiments of this disclosure.

Referring now to FIG. 3, system 300 is provided. System 300 depicts additional features in connection with fetching component 118. As detailed previously, fetching component 112 can receive stream data 108 that is included in media content container 104. In some embodiments, fetching component 112 can be configured to receive seek index data 110 from media content container 104. For example, fetching component 112 can receive seek index data 110 after presentation 118 of stream data 108 has begun.

Fetching component 112 can begin receiving seek index data 110 in response to various criteria. For instance, in some embodiments fetching component 112 can receive seek index data 110 in response to indication 302 of spare capacity with respect to resource utilization. As non-limiting examples, indication 302 can relate to available bandwidth 304, available processing/memory 306, or other resources utilization metrics associated with presentation 118.

Available bandwidth 304 can relate to network bandwidth, typically in connection with receiving stream data 108. For example, after media content container 104 is selected for presentation 118, all or a majority of network bandwidth can be allocated to download stream data 108. At some point during presentation 118, e.g., once a sufficient portion of stream data 108 has been buffered, or spare bandwidth capacity is otherwise determined, such spare capacity can be allocated to receipt of seek index data 110. Available processing/memory 306 can relate to computational and storage resources of device(s) 106 employed for decoding or otherwise presenting stream data 108. Thus, whether due to network-based or device-based limitations, resources utilized for obtaining seek index data 110 can be budgeted or scheduled in a more efficient manner and/or to reduce initial start time of presentation 118. Such can be accomplished by fetching component 112 requesting and/or receiving seek index data 110 in connection with indication 302 of spare capacity.

Additionally or alternatively, fetching component 112 can request and/or receive seek index data 110 in response to seek request 308 associated with presentation 118 of stream data 108. Seek request 308 can relate to a track selection of the media content, a fast-forward instruction, a rewind instruction, a repositioning of a progress slider associated with presentation 118, or the like. Such cases will typically only occur if the associated portions of seek index data 110 (and/or stream data 108) have not yet been received, but are now (e.g., due to user manipulation of presentation 118) required to resume presentation 118 at a different portion (e.g., due to user manipulation of presentation 118). In those cases, a delay might be observed prior to resuming presentation 118. However, this delay can be shorter in duration than what would be incurred had the seek index data 110 been received before presentation 118 begins and further may not noticeably occur at all.

In some embodiments, system 300 can include monitor component 310 that can be configured to monitor aspects of device(s) 106 and/or presentation 118. For example, monitor component 310 can monitor resource utilization associated with device(s) 106 and to provide indication 302 of spare capacity to fetching component 112. Monitor component 310 can also monitor input received by device(s) 106 (e.g., input received by a user interface associated with presentation 118). In response, monitor component 310 can provide seek request 308 to fetching component 112. Monitor component 310 can be included in or operatively coupled to system 100.

Figure 4:
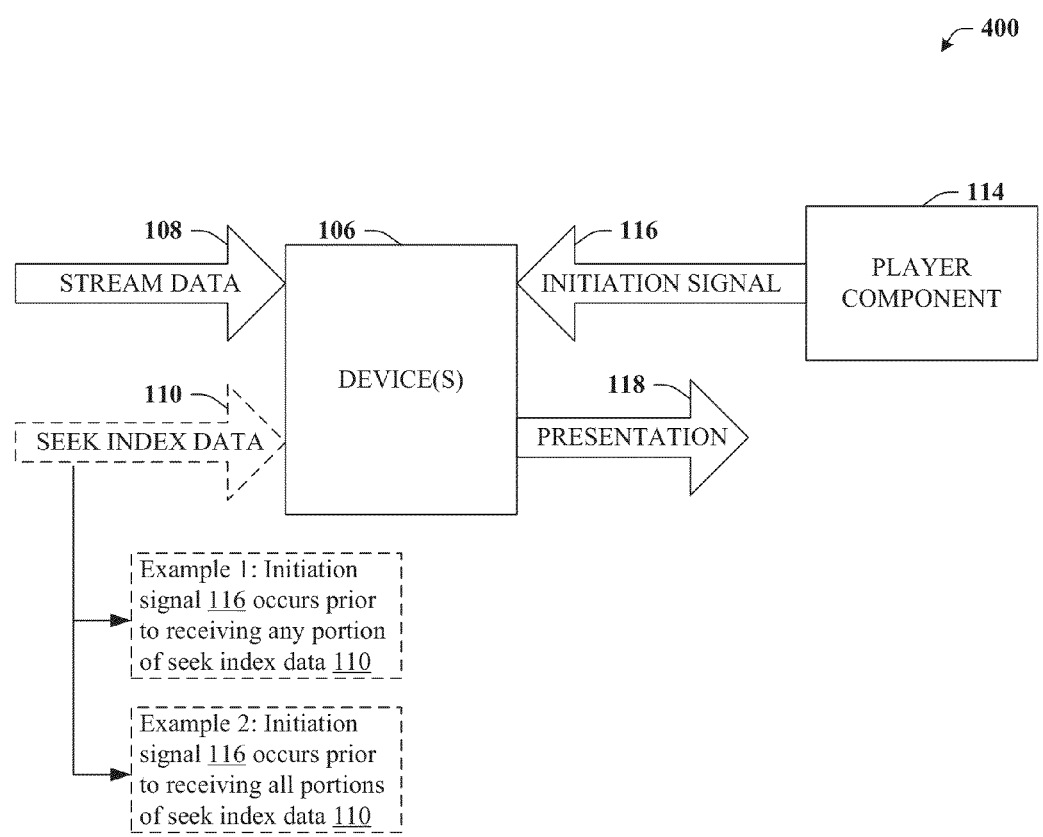
FIG. 4 illustrates a block diagram of a system that can provide for additional features in connection with receiving the seek index data after the presentation has begun in accordance with certain embodiments of this disclosure.

With reference now to FIG. 4, system 400 is depicted. System 400 can provide for additional features in connection with receiving seek index data 110 after presentation 118 has begun. As discussed previously, player component 114 can initiate presentation 118, for example, by issuing initiation signal 116. Initiation signal 116 can be provided after device 106 has received a sufficient portion of stream data 108 yet before device 106 has received seek index data 110. Device(s) 106 can receive stream data 108 and seek index data 110 from fetching component 112.

In some embodiments, player component 114 can provide initiation signal 116 to device(s) 106 prior to receiving any portions of seek index data 118. In other embodiments, player component 114 can provide initiation signal 116 to device(s) 106 prior to receiving all portions of seek index data 118. Hence, in certain cases some, but not all, seek index data 110 can be received prior to initiating presentation 118.

Example Implementation Architectures

Figure 5A:
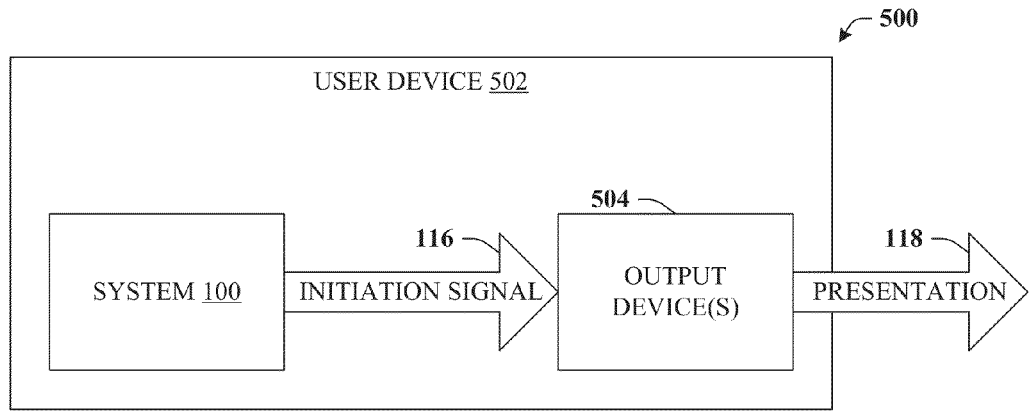
FIG. 5A illustrates a block diagram of a system associated with a user device implementation in accordance with certain embodiments of this disclosure.

Referring now to FIG. 5A, system 500 is depicted. System 500 can relate to a user device implementation. System 500 can include user device 502, which can be for example, a personal computer, laptop, phone, tablet, television, gaming console, or any other device capable of providing presentation 118. User device 502 can include all or portions of system 100 as detailed herein, such as identification component 102, fetching component 112, player component 114, and monitor component 310. Suitable output device(s) 504 (e.g., speakers, displays, etc.) can receive initiation signal 116 and, in response, begin presentation 118 presentation of stream data 108 prior to user device 502 receiving and/or loading seek index data 110.

Figure 5B:
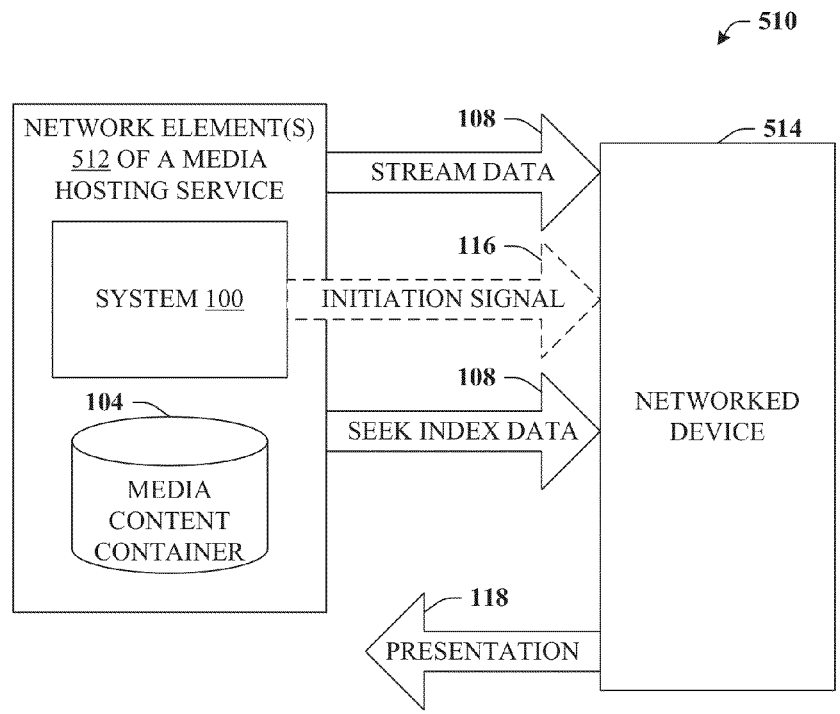
FIG. 5B illustrates a block diagram of a system associated with a server-based implementation in accordance with certain embodiments of this disclosure.

With reference to FIG. 5B, system 510 is illustrated. System 510 can relate to a server-based implementation. For example, a server or other network element(s) 512 of a media content hosting site or service can include all or portions of system 100. Generally, networked device 514, which can be similar to user device 502 of FIG. 5A, will request and/or select media content to be downloaded and presented. In response, networked device can receive at least a portion of stream data 108 from network element(s) 512. However, prior to receiving seek index data 108, networked device 514 can begin presentation of stream data 108 in response to initiation signal 116.

Initiation signal 116 can be provided by network element(s) 512 or by internal components of networked device 514 (e.g., all or portions of player component 114 can be included in network element(s) 512 or in networked device 514).

Figure 6:
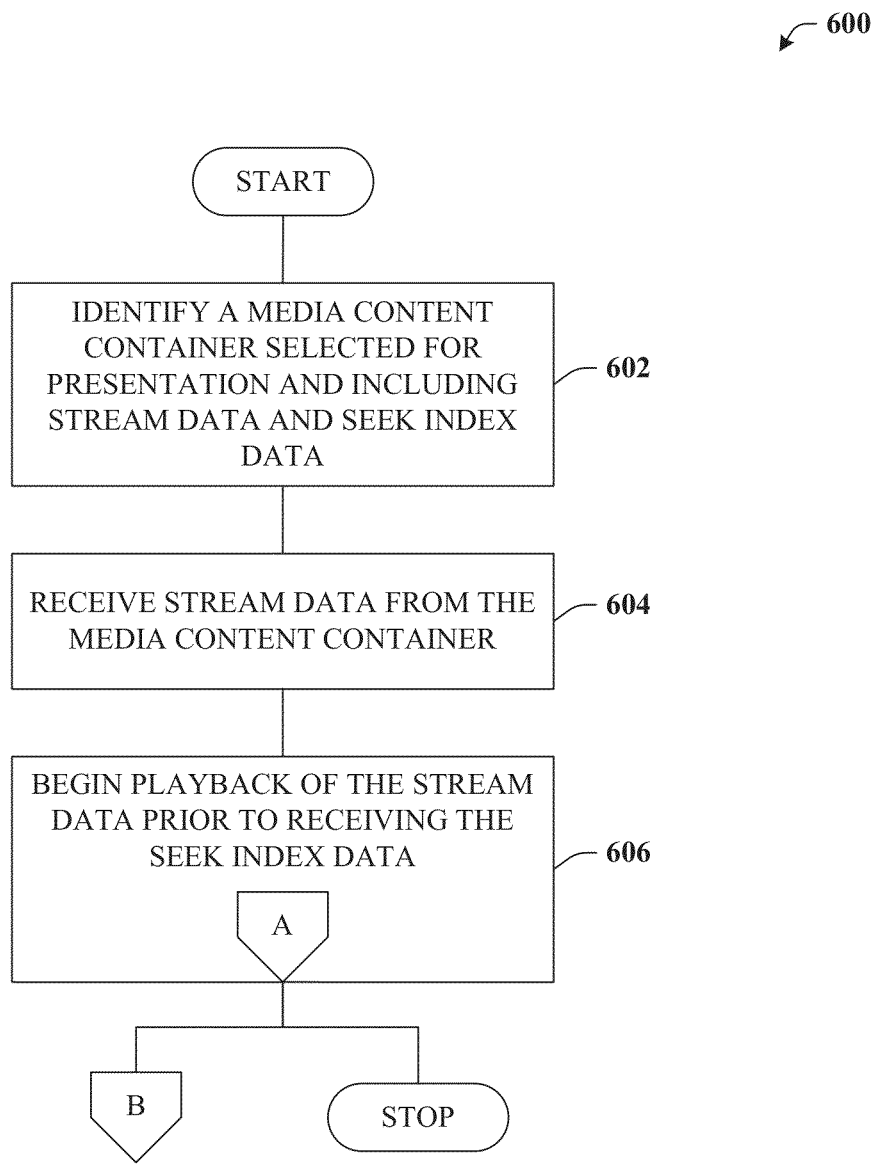
FIG. 6 illustrates an example methodology that can provide for beginning playback of media content prior to receiving seek index data in accordance with certain embodiments of this disclosure.
Figure 7:
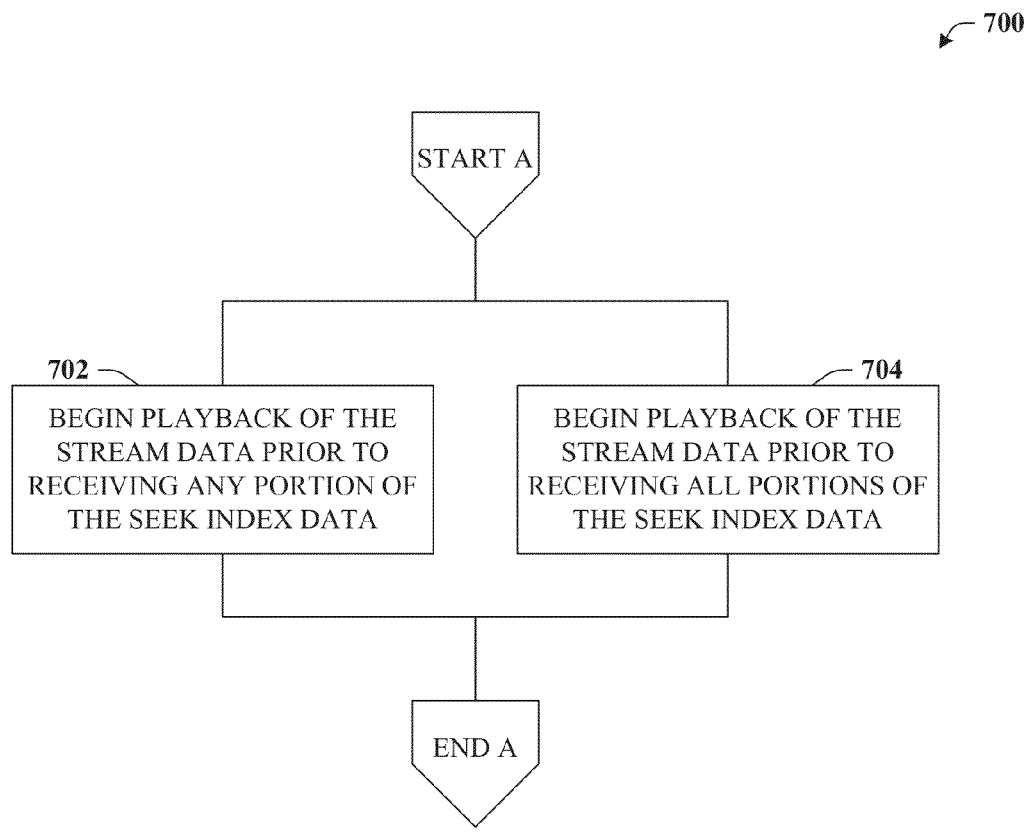
FIG. 7 illustrates an example methodology that can provide for additional features associated with beginning playback of stream data in accordance with certain embodiments of this disclosure.
Figure 8:
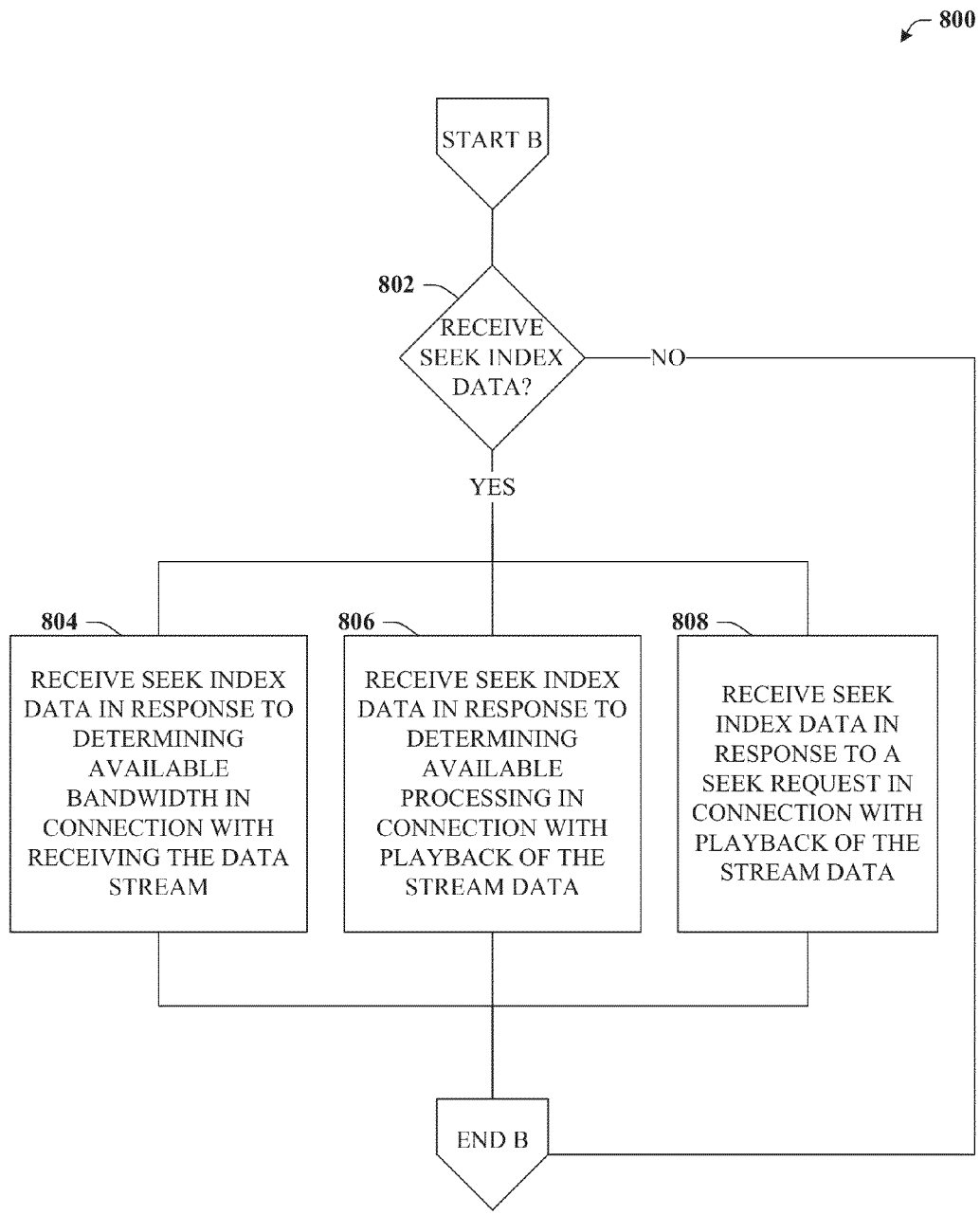
FIG. 8 illustrates an example methodology that can provide for handling seek index data in accordance with certain embodiments of this disclosure.

FIGS. 6-8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can provide for beginning playback of media content prior to receiving seek index data. For example, at reference numeral 602, a media content container selected for presentation can be identified (e.g., by an identification component). Typically, the media content container will include stream data (e.g., audio/video frames data) and seek index data (e.g., tables or indices associated with the sequence or time code of the frames).

At reference numeral 604, stream data can be received from the media content container (e.g., by a fetching component). It is understood that the entirety of stream data need not be received. Rather, only a sufficient portion for beginning playback of the stream data need be received.

At reference numeral 606, playback of the stream data can begin. For example, playback can be presented by one or more output devices and can be initiated by a playback component. In particular, playback can begin prior to receiving the seek index data, which can be accomplished according to various techniques further detailed in FIG. 7. Method 600 can proceed to insert A, insert B, or end. By beginning playback prior to receiving seek index data, delays associated with startup time for the playback can be reduced or postponed until a seek request occurs. Moreover, even if a seek request does occur, it is possible that no additional delay will be observable as the seek index data (or relevant portions thereof) might be received after playback has begun, but before the seek request occurs, during relatively low resource utilization times. Additionally or alternatively, in cases of adaptive streaming such efficiencies can be translated into higher quality of the presentation. For example, bandwidth savings obtain by not initially (or not at all) downloading seek index data can translate into more overall bandwidth for the content consumer, which might enable the consumer to support a higher resolution streaming download than otherwise.

Turning now to FIG. 7, exemplary method 700 is depicted. Method 700 can provide for additional features associated with beginning playback of stream data. As noted previously, at reference numeral 606 of FIG. 6, playback of stream data can begin prior to receiving stream data, which can accord with various distinct implementations. For example, in some embodiments, playback of the stream data can begin prior to receiving any portions of the seek index data, as indicated at reference numeral 702. In other embodiments, playback of the stream data can begin prior to receiving all portions of the seek index data, as indicated at reference numeral 704.

Turning now to FIG. 8, example method 800 is illustrated. Method 800 can provide for handling seek index data. Method 800 can begin with the start of insert B. At reference numeral 802, a determination can be made as to whether or not to receive seek index data. Typically, seek index data will be received, however, in some scenarios such is not strictly required. For example, if no seek requests occur during playback, it might not be necessary to receive seek index data at all, in which can method 800 can end.

According to various embodiments, method 800 proceeds to at least one of reference numerals 804, 806, or 808. At reference numeral 804, seek index data can be received in response to determining spare bandwidth capacity in connection with receiving the data stream. For example, seek index data can be requested and/or received in response to a spare capacity determination. Thereafter, method 800 can end.

At reference numeral 806, seek index data can be received in response to determining spare processing capacity in connection with receiving and/or playback of the stream data. For example, seek index data can be requested and/or received in response to a spare capacity determination associated with processor or memory utilization. Method 800 can then terminate.

At reference numeral 808, seek index data can be received in response to a seek request in connection with playback of the stream data. For example, input can be received to skip or rewind portions of the playback of the data stream. Such input can invoke the seek request for all or a portion of seek index data. Method 800 can then terminate.

Selection between reference numerals 804, 806, and 808, as well as a determination as to when seek index data is requested and/or received can be provided by a monitor component.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
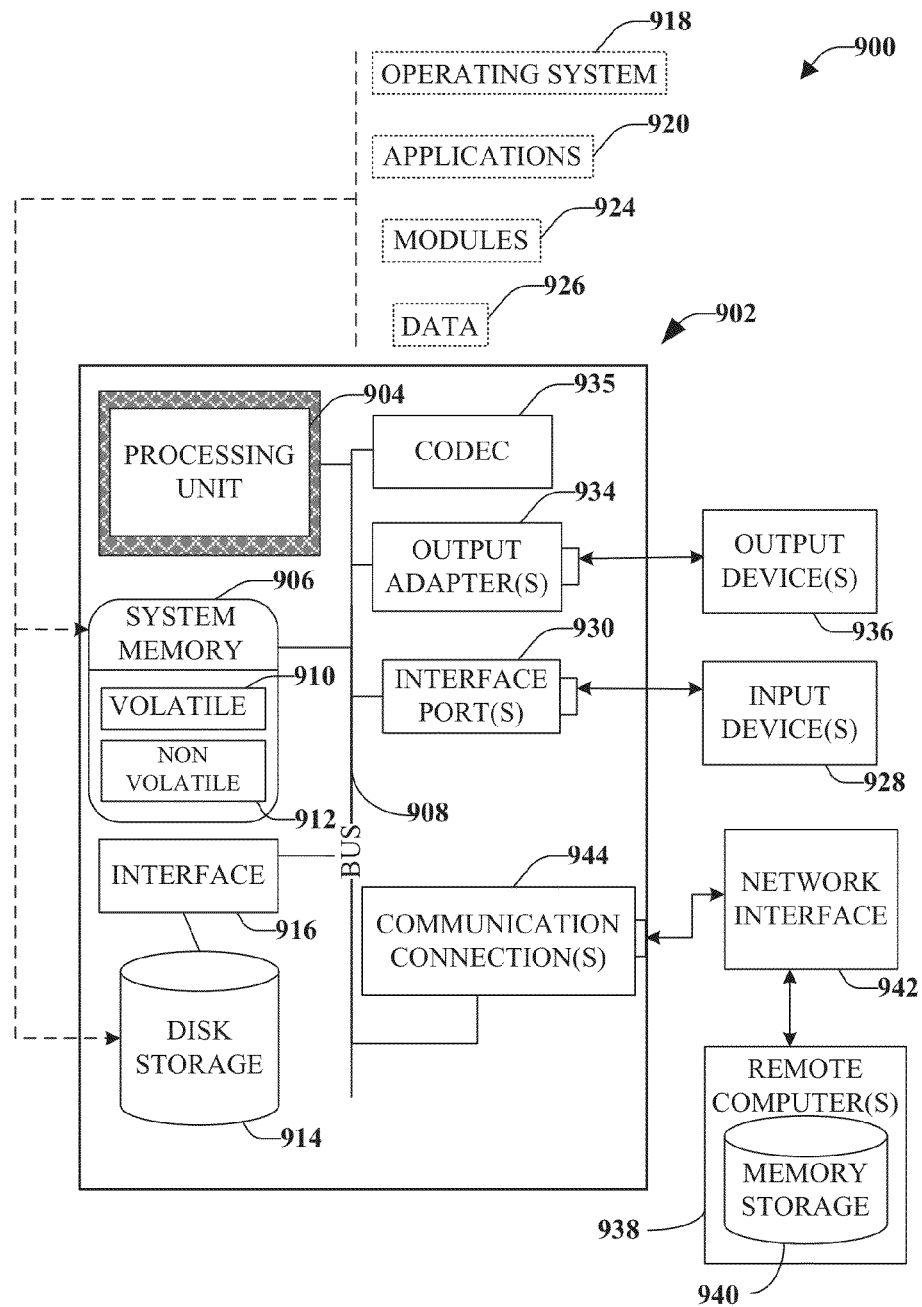
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all or portions of codec 935 can be included in encoding component 118 and/or decoding component 514. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
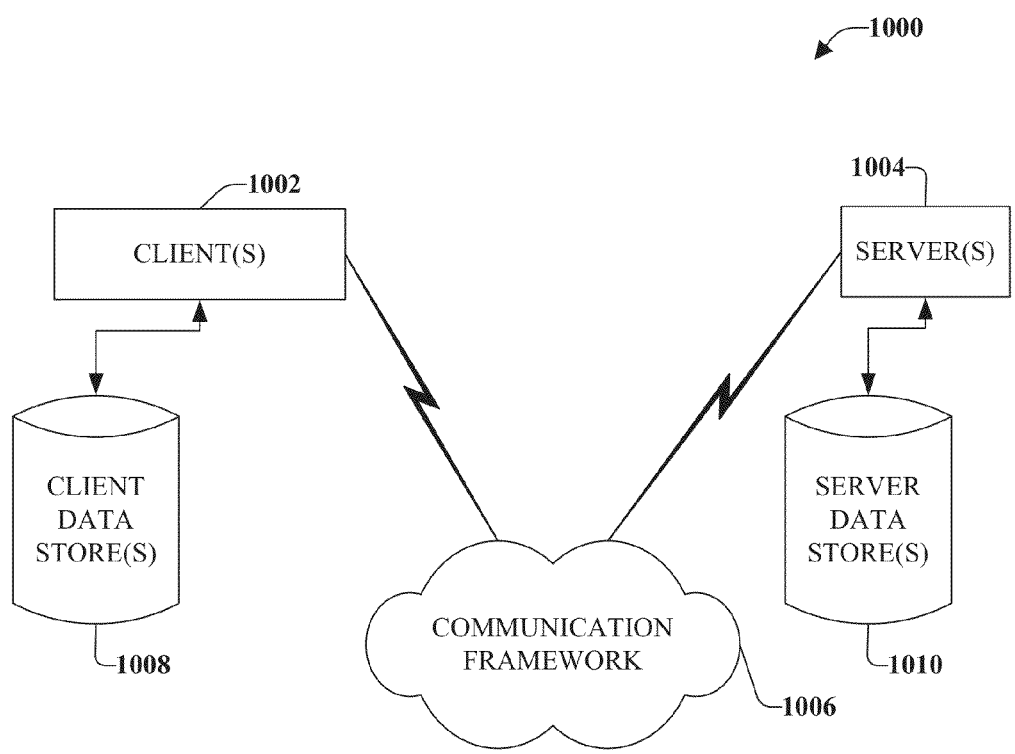
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
a memory that stores computer executable components; and
a microprocessor that executes the following computer executable components stored in the memory:
an identification component that identifies a media content container associated with media content selected for presentation by one or more devices, the media content container is formatted to include stream data that includes a frame associated with the media content and seek index data that includes timing data associated with playback of the frame;
a fetching component that receives the stream data; and
a player component that initiates presentation of the stream data by the one or more devices prior to receiving the seek index data associated with the stream data being presented.

2. The system of claim 1, wherein the media content container is formatted according to a video encoding format.

3. The system of claim 1, wherein the media content container is formatted according to an audio encoding format.

4. The system of claim 1, wherein the media content container is stored as a file with the seek index data at the end of the file.

5. The system of claim 1, wherein the fetching component receives the seek index data from the media content container in response to an indication of spare capacity.

6. The system of claim 5, wherein the indication of spare capacity relates to available bandwidth in connection with receiving the stream data.

7. The system of claim 5, wherein the indication of spare capacity relates to available processing in connection with presentation of the stream data.

8. The system of claim 1, wherein the fetching component receives the seek index data from the media content container in response to a seek request in connection with presentation of the stream data.

9. The system of claim 1, further comprising a monitor component that monitors resource utilization and issues a seek request to the fetching component in response to an indication that resources are available for obtaining the seek index data.

10. The system of claim 1, wherein the player component initiates presentation of the stream data by the one or more devices prior to receiving any portions of the seek index data.

11. The system of claim 1, wherein the player component initiates presentation of the stream data by the one or more devices prior to receiving all portions of the seek index data.

12. A method, comprising:
employing a computer-based processor to execute computer executable components stored within a memory to perform the following:
identifying a media content container associated with media content selected for presentation, the media content container formatted to include stream data comprising a playable frame of the media content and seek index data comprising timing information associated with playback of the playable frame;
receiving the stream data from the media content container; and
beginning playback of the stream data without receiving the seek index data that pertains to the stream data being played.

13. The method of claim 12, further comprising receiving the seek index data from the media content container.

14. The method of claim 13, wherein the receiving the seek index data is initiated in response to spare capacity.

15. The method of claim 14, wherein the spare capacity relates to available bandwidth in connection with receiving the stream data.

16. The method of claim 14, wherein the spare capacity relates to available processing in connection with playback of the stream data.

17. The method of claim 12, wherein the receiving the seek index data is initiated in response to a seek request in connection with playback of the stream data.

18. The method of claim 12, wherein the beginning playback of the stream data occurs prior to receiving any portions of the seek index data.

19. The method of claim 12, wherein the beginning playback of the stream data occurs prior to receiving all portions of the seek index data.

20. A system, comprising:
a memory means and a processing means;
means for identifying a media content container associated with media content selected for presentation, the media content container formatted to include stream data with at least one frame presented during the presentation and seek index data with timing data relating to a timing associated with presentation of the at least one frame;
means for receiving the stream data from the media content container; and
means for beginning presentation of the stream data before receiving the seek index data relating to the stream data being presented.

* * * * *